(12) United States Patent  
Kakimura

(10) Patent No.: US 11,171,378 B2
(45) Date of Patent: Nov. 9, 2021

(54) ENERGY STORAGE APPARATUS

(71) Applicants: Blue Energy Co., Ltd., Kyoto (JP); Honda Motor Co., Ltd., Tokyo (JP)

(72) Inventor: Hiroaki Kakimura, Kyoto (JP)

(73) Assignee: BLUE ENERGY CO., LTD., Kyoto (JP)

( * ) Notice: Subject to any disclaimer, the term of this patent is extended or adjusted under 35 U.S.C. 154(b) by 156 days.

(21) Appl. No.: 16/054,832

(22) Filed: Aug. 3, 2018

(65) Prior Publication Data

US 2019/0051872 A1 Feb. 14, 2019

(30) Foreign Application Priority Data

Aug. 8, 2017 (JP) .............................. JP2017-153388

(51) Int. Cl.
*H01M 50/20* (2021.01)
*B60L 50/60* (2019.01)
(Continued)

(52) U.S. Cl.
CPC ............... *H01M 50/20* (2021.01); *B60K 1/04* (2013.01); *B60K 6/28* (2013.01); *B60L 50/66* (2019.02);
(Continued)

(58) Field of Classification Search
CPC . B60K 1/04; B60K 6/28; B60L 50/66; H01M 10/0481; H01M 10/0525;
(Continued)

(56) References Cited

U.S. PATENT DOCUMENTS 4,898,795 A * 2/1990 Stocchiero .......... H01M 50/147
429/66
5,725,396 A * 3/1998 Stocchiero .......... H01M 50/572
439/627
(Continued)

FOREIGN PATENT DOCUMENTS

JP 2013-077546 A 4/2013
JP 2014-044884 A 3/2014
(Continued)

*Primary Examiner* — Miriam Stagg
*Assistant Examiner* — Lilia Nedialkova
(74) *Attorney, Agent, or Firm* — McGinn I.P. Law Group, PLLC

(57) ABSTRACT

An energy storage apparatus includes: an energy storage device; an insulating adjoining member adjoining the energy storage device in a first direction; a conductive opposite member facing the energy storage device and the adjoining member in a second direction orthogonal to the first direction; an insulating member disposed between the energy storage device and adjoining member and the opposite member; and a conductive fastening member disposed through the insulating member in the second direction to fasten the adjoining member to the opposite member. At least one of the adjoining member and the insulating member includes an opposite projection projecting toward an other of the adjoining member and the insulating member and facing a periphery of the fastening member, and the opposite projection is in contact with the other of the adjoining member and the insulating member.

18 Claims, 9 Drawing Sheets

(51) Int. Cl.
  *H01M 50/502* (2021.01)
  *B60K 1/04* (2019.01)
  *B60K 6/28* (2007.10)
  *H01M 10/04* (2006.01)
  *H01M 10/0525* (2010.01)

(52) U.S. Cl.
  CPC ..... *H01M 10/0481* (2013.01); *H01M 50/502* (2021.01); *H01M 10/0525* (2013.01); *H01M 2220/20* (2013.01)

(58) Field of Classification Search
  CPC .. H01M 2/1077; H01M 2/1083; H01M 2/206; H01M 2220/20; H01M 50/20; H01M 50/502
  See application file for complete search history.

(56) References Cited

U.S. PATENT DOCUMENTS

| | | | | |
|---|---|---|---|---|
| 5,985,480 | A | * 11/1999 | Sato | H01M 50/598 429/65 |
| 2012/0129042 | A1 | * 5/2012 | Kurahashi | H01M 50/502 429/158 |
| 2013/0084471 | A1 | 4/2013 | Han et al. | |
| 2015/0072175 | A1 | * 3/2015 | DeKeuster | H01M 10/482 429/7 |
| 2016/0190526 | A1 | 6/2016 | Yamada et al. | |
| 2018/0138473 | A1 | 5/2018 | Bessho et al. | |

FOREIGN PATENT DOCUMENTS

| | | |
|---|---|---|
| JP | 2016-122572 A | 7/2016 |
| JP | 2016-178085 A | 10/2016 |
| JP | 2017-050200 A | 3/2017 |
| WO | WO 2017/017913 A1 | 2/2017 |

\* cited by examiner

FIG. 3
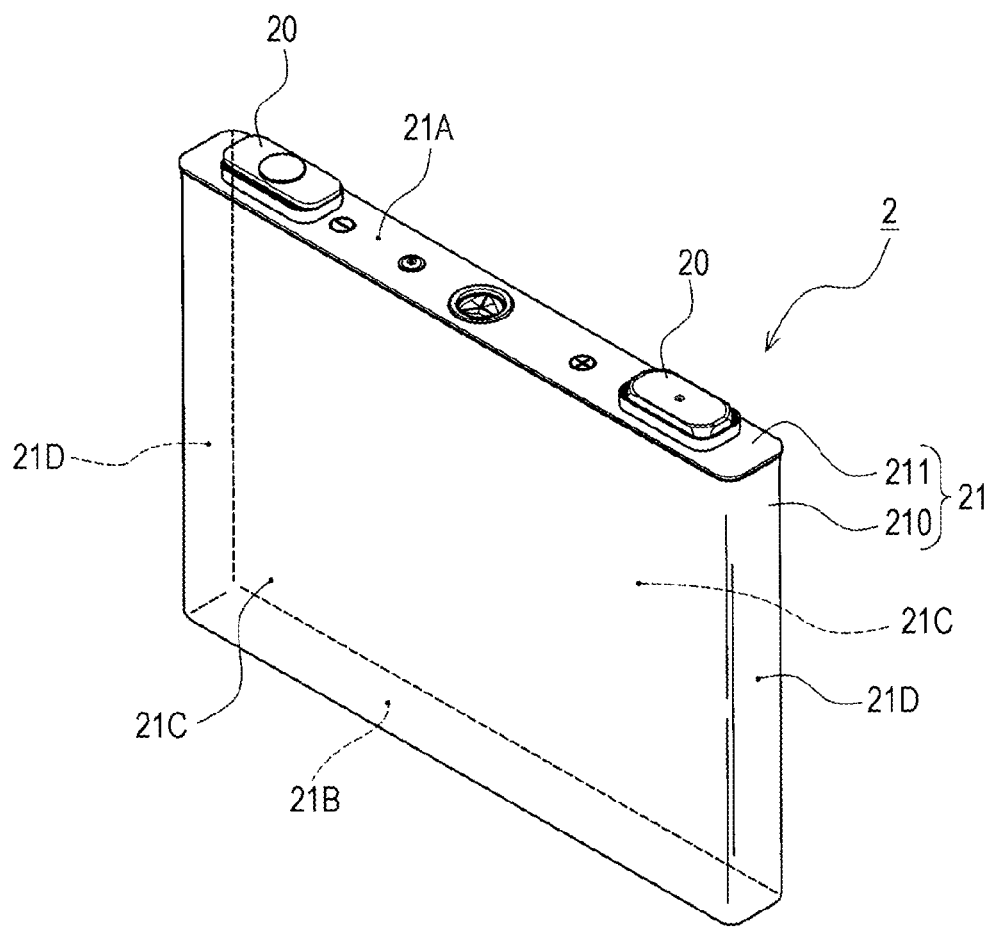
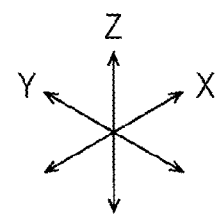

ENERGY STORAGE APPARATUS

CROSS-REFERENCE TO RELATED APPLICATIONS

This application claims the benefit of Japanese patent application No. 2017-153388 filed on Aug. 8, 2017, which is incorporated by reference.

FIELD

The present invention relates to an energy storage apparatus.

BACKGROUND

Conventionally, battery systems including a plurality of flat secondary batteries are provided in consideration of vibration resistance and shock resistance (see JP 2014-44884 A, for example).

Such a battery system includes: a group of stacked batteries having a plurality of flat secondary batteries stacked in the thickness direction, a pair of end plates disposed at both end faces of the group of stacked batteries in the stacking direction, a binding bar coupled to the end plates to bind the flat secondary batteries in the stacking direction with pressure, and an intermediate reinforcing plate disposed between the flat secondary batteries of the group of stacked batteries and bound by the binding bar.

The binding bar is a conductive metal component, and has a fixing part in the intermediate part to be coupled to the intermediate reinforcing plate. The fixing part of the binding bar has a through-hole to accept a fixing screw. In the above battery system, the intermediate reinforcing plate is fastened to the binding bar by the fixing screw in the through-hole in the fixing part.

In this battery system, the stacked flat secondary batteries, end plates, and intermediate reinforcing plate are fixed to each other with pressure. In other words, the group of stacked batteries (the flat secondary batteries) is positioned with respect to the intermediate reinforcing plate.

In the battery system, since the intermediate reinforcing plate is fixed to the binding bar by the fixing screw, the metal fixing screw in the through-hole in the fixing part of the binding bar is disposed between the intermediate reinforcing plate and the binding bar.

Therefore, water drops due to dew condensation or the like may contact the battery system, intrude between the intermediate reinforcing plate and the binding bar, and reach the fixing screw therebetween, which may cause a liquid junction (short circuit).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus that prevents a liquid junction due to the contact of water drops.

An energy storage apparatus according to an aspect of the present invention includes: an energy storage device; an insulating adjoining member adjoining the energy storage device in a first direction; a conductive opposite member facing the energy storage device and the adjoining member in a second direction orthogonal to the first direction; an insulating member disposed between the energy storage device and adjoining member and the opposite member; and a conductive fastening member disposed through the insulating member in the second direction to fasten the adjoining member to the opposite member. At least one of the adjoining member and the insulating member includes an opposite projection projecting toward an other of the adjoining member and the insulating member and facing a periphery of the fastening member, and the opposite projection is in contact with the other of the adjoining member and the insulating member.

BRIEF DESCRIPTION OF DRAWINGS

The foregoing and other features of the present invention will become apparent from the following description and drawings of an illustrative embodiment of the invention in which:

FIG. 3 is a perspective view of an energy storage device of the energy storage apparatus.

DESCRIPTION OF EMBODIMENT

Figure 1:
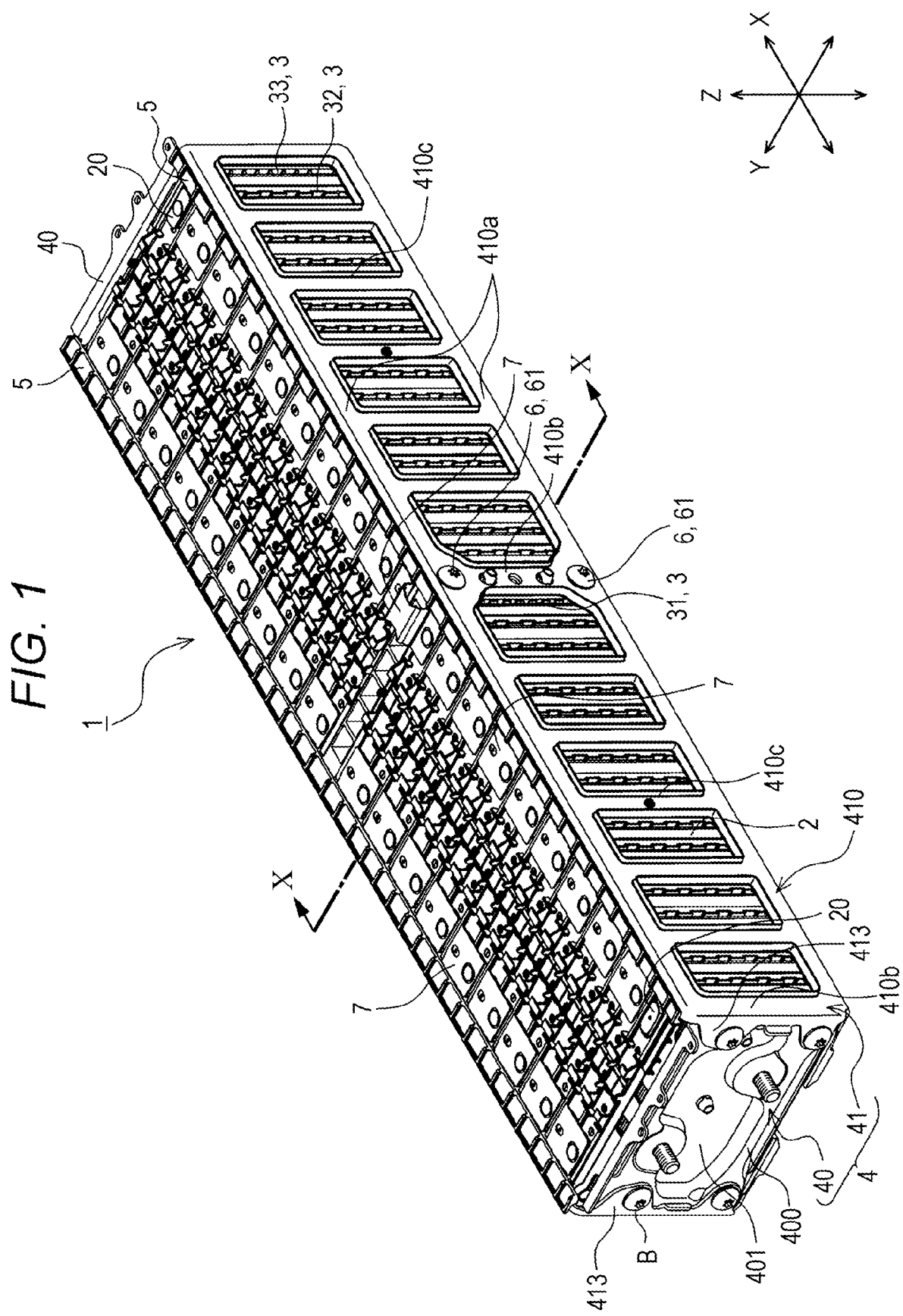
FIG. 1 is a perspective view of an energy storage apparatus according to an embodiment of the present invention.

According to an aspect of the present invention, there is provided an energy storage apparatus including: an energy storage device; an insulating adjoining member adjoining the energy storage device in a first direction; a conductive opposite member facing the energy storage device and the adjoining member in a second direction orthogonal to the first direction; an insulating member disposed between the energy storage device and adjoining member and the opposite member; and a conductive fastening member disposed through the insulating member in the second direction to fasten the adjoining member to the opposite member. At least one of the adjoining member and the insulating member includes an opposite projection projecting toward an other of the adjoining member and the insulating member and facing a periphery of the fastening member, and the opposite projection is in contact with the other of the adjoining member and the insulating member.

According to this configuration, since the insulating member is disposed between the energy storage device and the opposite member, the insulating member insulates the opposite member from the energy storage device. Since the opposite projection faces the periphery of the conductive fastening member between the adjoining member and the insulating member (blocks the pass to the fastening member), water drops intruding between the insulating member and the adjoining member cannot reach the fastening member. In other words, the opposite projection prevents the intrusion of water drops. Since the adjoining member and the insulating member have insulating properties, the opposite projection belonging to at least one of these members also has insulating properties. This prevents the electrical connection between the opposite projection and the fastening member when water drops intrude and adheres to the opposite projection. The liquid junction (short circuit) due to the contact of water drops is thus prevented.

The opposite projection may be elastically deformable. At least one of the adjoining member and the insulating member may include a cut separating the opposite projection in the circumferential direction of the fastening member.

According to this configuration, the cut breaks the continuity of the opposite projection in the circumferential direction. This facilitates the elastic deformation of the opposite projection when the opposite projection comes into contact with the other of the adjoining member and the insulating member, which provides a tighter contact of the opposite projection with the corresponding member.

The opposite projection may be tapered toward the tip end in a projecting direction of the opposite projection.

According to this configuration, the tip end of the opposite projection is easily deformed when the opposite projection comes into contact with the other of the adjoining member and the insulating member. This provides a tighter contact of the opposite projection with the other of the adjoining member and the insulating member.

At least one of the adjoining member and the insulating member may have an external projection disposed outside the opposite projection in the direction orthogonal to the second direction and overlapped with at least the cut and both ends of the opposite projection defining the cut when viewed from the direction orthogonal to the second direction.

According to this configuration, the external projection prevents the intrusion of water drops moving toward the cut. Even when the cut is provided to facilitate the deformation of the opposite projection, the external projection prevents water drops from going over the opposite projection to reach the fastening member.

The other of the adjoining member and the insulating member may include a recess to accept the external projection.

This configuration enables the external projection to completely cover the cut. This configuration further prevents the intrusion of water drops into the area encompassed by the opposite projection.

According to an embodiment of the present invention, the liquid junction due to the contact of water drops is prevented.

An embodiment of the present invention will now be described with reference to the drawings. The names of individual structural members (individual structural elements) of this embodiment are original to this embodiment and may be different from the names of individual structural members (individual structural elements) in the background art described in BACKGROUND.

Figure 2:
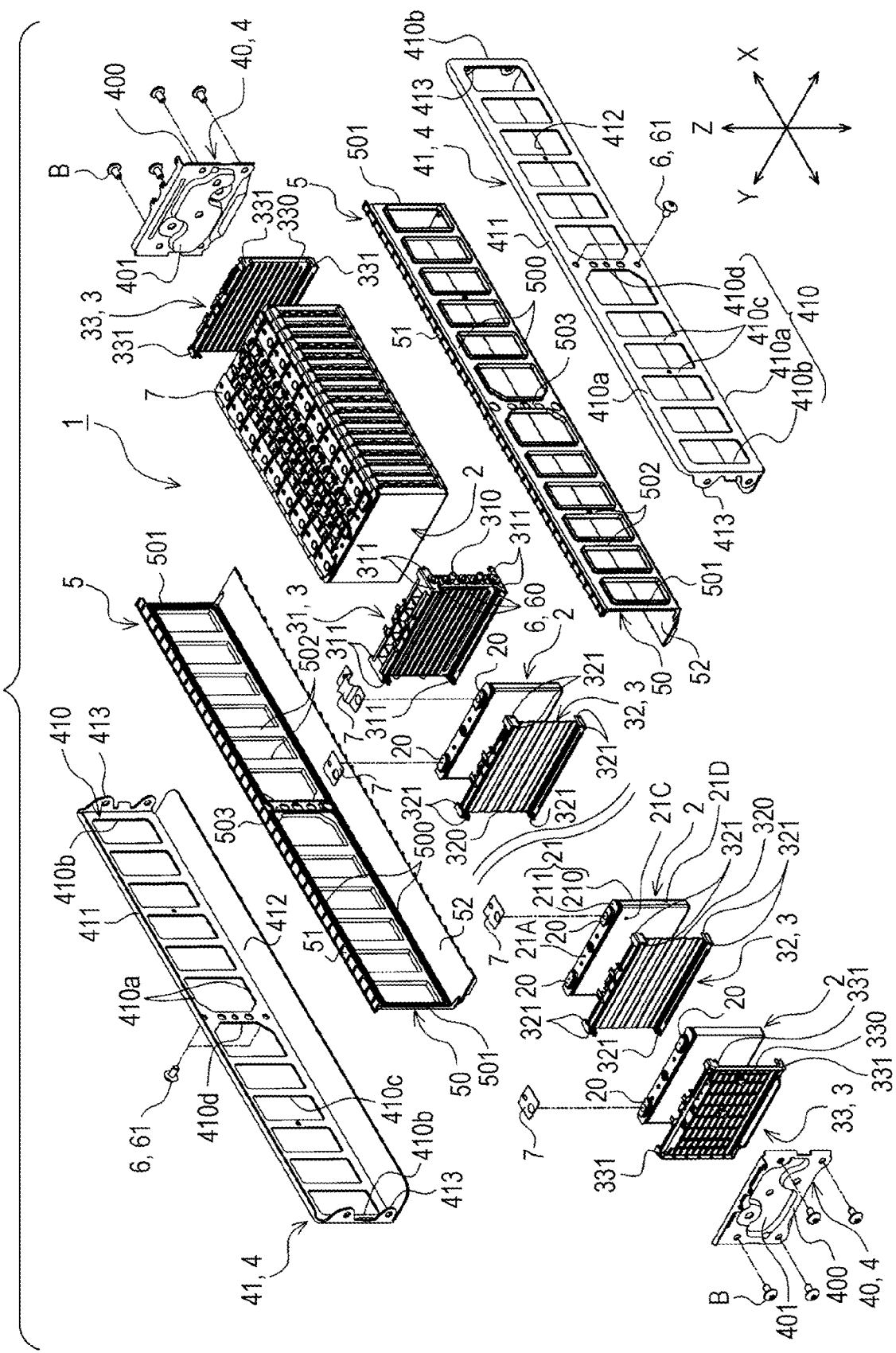
FIG. 2 is an exploded perspective view of the energy storage apparatus with some parts omitted.

As shown in FIGS. 1 and 2, an energy storage apparatus 1 includes: an energy storage device 2 having external terminals 20, an adjoining member 3 adjoining the energy storage device 2 in a first direction (the X-axis direction in this embodiment), and a holding member 4 having a part facing the energy storage device 2 and the adjoining member 3 at least in a second direction orthogonal the X-axis direction (the Y-axis direction in this embodiment) and holding the energy storage device 2 and the adjoining member 3. In this embodiment, the energy storage apparatus 1 includes: a plurality of energy storage devices 2 disposed in the X-axis direction, a plurality of adjoining members 3 disposed for the respective energy storage devices 2, and the holding member 4 holding the energy storage devices 2 and the adjoining members 3 all together. The energy storage apparatus 1 also includes: an insulator (insulating member) 5 disposed between the holding member 4 and the energy storage devices 2, and a fastening member 6 fastening a specific adjoining member 3 of the adjoining members 3 to the holding member 4. The energy storage apparatus 1 also includes a bus bar 7 connected to the external terminals 20 of each energy storage device 2.

Examples of the energy storage device 2 include primary batteries, secondary batteries, and capacitors. The energy storage device 2 of this embodiment is a nonaqueous electrolyte secondary battery that can be charged and discharged. More specifically, the energy storage device 2 of this embodiment is a lithium ion secondary battery using electron transfer due to lithium ion transfer.

Figure 4:
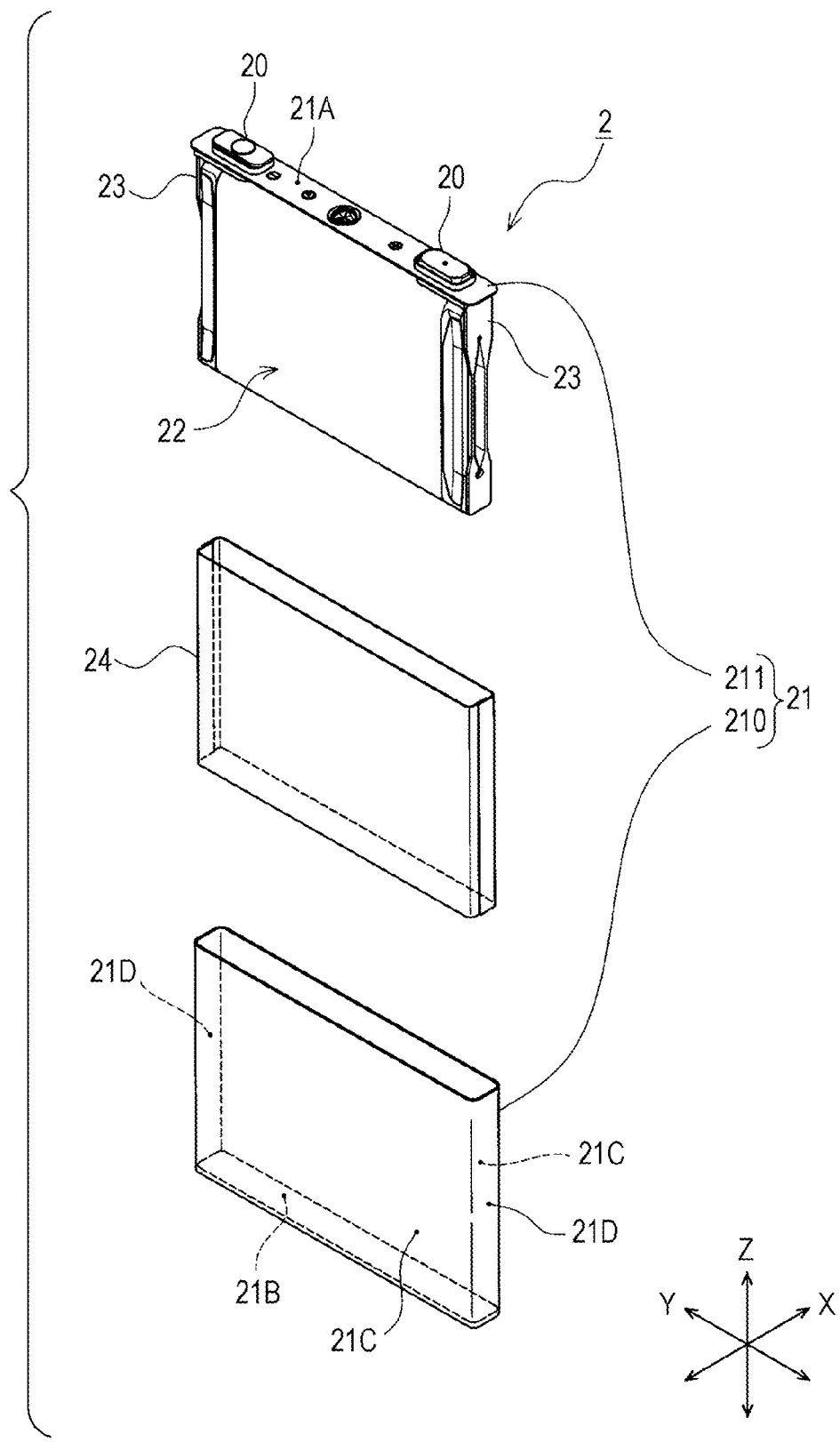
FIG. 4 is an exploded perspective view of the energy storage device.

As shown in FIG. 3, each energy storage device 2 includes the external terminals 20. Specifically, as shown in FIG. 4, each energy storage device 2 includes an electrode assembly 22, a case 21 housing the electrode assembly 22 together with electrolyte solution, the external terminals 20 at least partially exposed to the outside of the case 21, a current collector 23 connecting the electrode assembly 22 and the external terminals 20, and an in-case insulator 24 disposed between the electrode assembly 22 and the case 21.

The case 21 includes a case body 210 having an opening, and a lid plate 211 closing the opening in the case body 210. The external terminals 20 are disposed on the lid plate 211. The case body 210 of this embodiment is in the shape of an open-top and closed-bottom rectangular column, and the case 21 is in the shape of a rectangular parallelepiped (a hexahedron). Accordingly, as shown in FIG. 3, the case 21 has the external faces including a first end face 21A (the external face of the lid plate 211) on which the external terminals 20 are disposed, a second end face 21B opposite to the first end face 21A in a third direction orthogonal to the X-axis direction and the Y-axis direction (the Z-axis direction in this embodiment), a pair of third end faces 21C opposite to each other in the X-axis direction, and a pair of fourth end faces 21D opposite to each other in the Y-axis direction.

In this embodiment, the case 21 is thin in the X-axis direction. Accordingly, each third end face 21C has a wider area than any one of the first end face 21A, the second end face 21B, and the fourth end faces 21D. In this embodiment, the energy storage devices 2 are disposed in the X-axis direction such that the third end faces 21C (the wide faces) are disposed opposite to each other (See FIG. 2).

The electrode assembly 22 has a positive electrode and a negative electrode layered alternately with a separator therebetween. As shown in FIG. 4, the electrode assembly 22 of this embodiment is a so-called rolled electrode assembly in which the elongated positive and negative electrodes with the separator therebetween are layered and rolled. In the electrode assembly 22, lithium ions move between the positive electrode and the negative electrode, which charges or discharges the energy storage device 2.

With reference back to FIG. 2, each adjoining member 3 is disposed between two energy storage devices 2 disposed in the X-axis direction or between one energy storage device 2 and a member (a part of the holding member 4 in this embodiment) disposed with respect to the energy storage device 2 in the X-axis direction. The energy storage apparatus 1 of this embodiment includes different types of the adjoining members 3. Specifically, the energy storage apparatus 1 includes three types of the adjoining members 3: a first adjoining member 31 disposed between two energy storage devices 2 in the middle area in which some of the energy storage devices 2 are disposed, a second adjoining member 32 disposed between two energy storage devices 2 in other area than the middle area, and a third adjoining member 33 disposed next to the external side of one of the energy storage device 2 disposed outermost in the X-axis direction.

Figure 5:
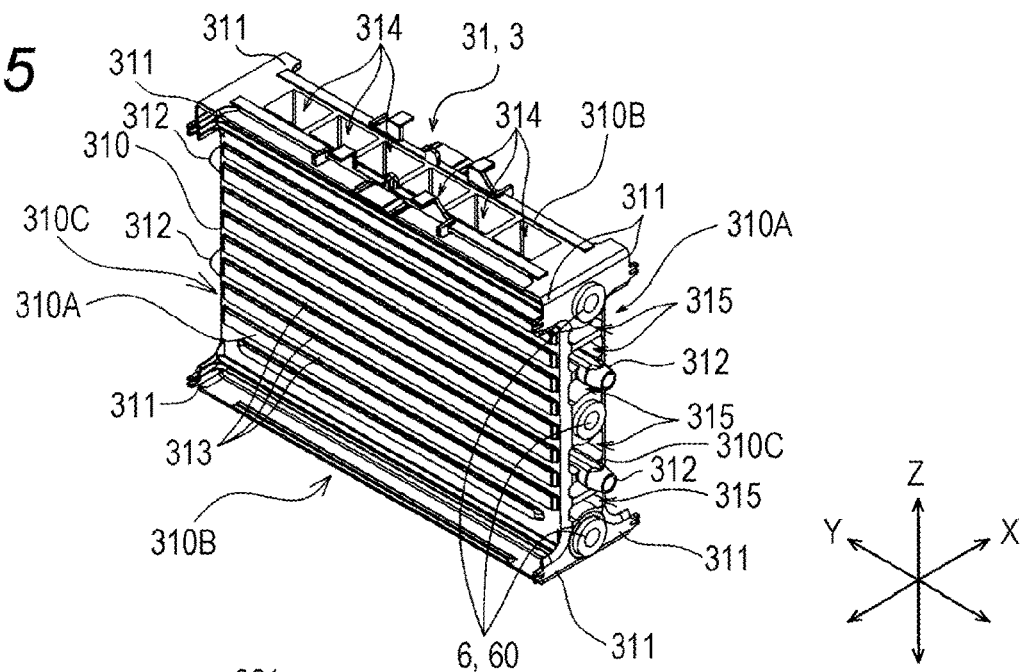
FIG. 5 is a perspective view of a first adjoining member of the energy storage apparatus.

The first adjoining member 31 has insulating properties, and is disposed between two energy storage devices 2 to ensure a distance (such as a creepage distance) between the energy storage devices 2. Specifically, as shown in FIG. 5, the first adjoining member 31 includes a first body part 310 adjacent to the energy storage devices 2 (the case bodies 210), and a first stopper part 311 for preventing the displacement of the corresponding energy storage device 2 with respect to the first body part 310. The first adjoining member 31 also includes a positioning part 312 for determining the position of the first adjoining member 31 with respect to the holding member 4.

The first body part 310 extends in the Y-Z plane (the plane extending in the Y-axis and the Z-axis) and has a thickness in the X-axis direction. Accordingly, the first body part 310 of the first adjoining member 31 faces the third end faces 21C of the energy storage devices 2 in the X-axis direction. The first body part 310 of this embodiment defines passages together with the adjacent energy storage devices 2. The passages allow temperature regulating fluid (air in this embodiment) to flow between the first body part 310 and the adjacent energy storage devices 2. The first body part 310 faces the insulators 5 in the Y-axis direction.

Details of the first adjoining member 31 will now be described. In the first adjoining member 31, the first body part 310 has a pair of first faces 310A facing outward in the X-axis direction, a pair of second faces 310B facing outward in the Z-axis direction, and a pair of third faces 310C facing outward in the Y-axis direction.

Each first face 310A of the first body part 310 has a plurality of grooves 313 extending in the Y-axis direction. The grooves 313 define the fluid passages.

The first body part 310 has a plurality of lightening through-holes 314 extending in the Z-axis direction. Accordingly, the holes 314 are open in the second faces 310B of the first body part 310.

The first body part 310 has a recess 315 open in each third face 310C. In this embodiment, the first body part 310 has a plurality of recesses 315 open in each third face 310C. The recesses 315 are spaced from each other in the Z-axis direction. Accordingly, the first body part 310 is solid between the recesses 315.

Each first stopper part 311 extends from the first body part 310 in the X-axis direction, and is in contact with an external face in the Y-Z plane of an energy storage device 2 (specifically its case 21) adjacent to the first body part 310 so as to prevent the energy storage device 2 from being displaced with respect to the first body part 310 in the Y-Z plane.

The positioning part 312 of the first adjoining member 31 is fit in holes in the holding members 4. Specifically, the positioning part 312 is a shaft fit in the first body part 310 and extending in the Y-axis direction with both ends projecting outward from the third faces 310C of the first body part 310. Since the recesses 315 are open in the third faces 310C of the first body part 310, the positioning part 312 is disposed between two specific recesses 315.

Figure 6:
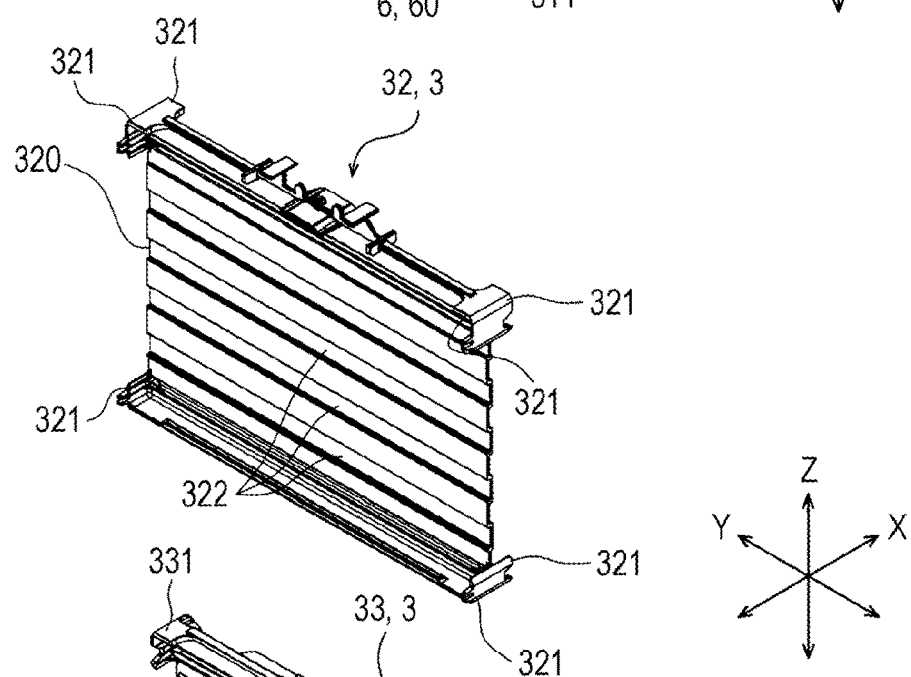
FIG. 6 is a perspective view of a second adjoining member of the energy storage apparatus.

The second adjoining member 32 has insulating properties, and is disposed between two energy storage devices 2 to ensure a distance (such as a creepage distance) between the energy storage devices 2. Specifically, as shown in FIG. 6, the second adjoining member 32 includes a second body part 320 adjacent to the energy storage devices 2 (the case bodies 210), and a second stopper part 321 for preventing the displacement of the corresponding energy storage device 2 with respect to the second body part 320.

The second body part 320 faces the third end faces 21C of the energy storage devices 2 and extends in the Y-Z plane (the plane extending in the Y-axis and the Z-axis). The second body part 320 of this embodiment defines passages together with the adjacent energy storage devices 2. The passages allow temperature regulating fluid (air in this embodiment) to flow between the second body part 320 and the adjacent energy storage devices 2. In this embodiment, the second body part 320 is a thin part formed in rectangular waves when viewed from the Y-axis direction. Accordingly, both sides of the second body part 320 in the X-axis direction has a plurality of grooves 322 extending in the Y-axis direction and defining the fluid passages.

Each second stopper part 321 extends from the second body part 320 in the X-axis direction, and is in contact with an external face in the Y-Z plane of an energy storage device 2 (specifically its case 21) adjacent to the second body part 320 so as to prevent the energy storage device 2 from being displaced with respect to the second body part 320 in the Y-Z plane.

Figure 7:
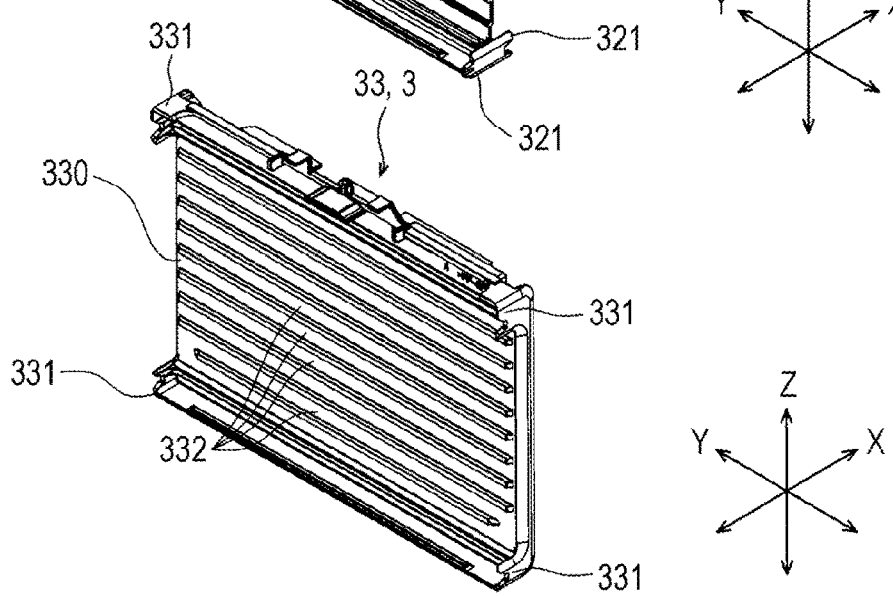
FIG. 7 is a perspective view of a third adjoining member of the energy storage apparatus.

The third adjoining member 33 has insulating properties, and is disposed between an energy storage device 2 and a holding member 4 (an end member 40) in the X-axis direction to ensure a distance (such as a creepage distance) between the energy storage device 2 and the holding member 4 (the end member 40). Specifically, as shown in FIG. 7, the third adjoining member 33 includes a third body part 330 adjacent to the energy storage device 2 between the energy storage device 2 and the holding member 4, and a third stopper part 331 for preventing the displacement of the energy storage device 2 with respect to the third body part 330.

The third body part 330 faces a third end face 21C of the energy storage device 2 and extends in the Y-Z plane. The third body part 330 of this embodiment defines passages together with the adjacent energy storage device 2. The passages allow temperature regulating fluid (air in this embodiment) to flow between the third body part 330 and the adjacent energy storage device 2. In this embodiment, the third body part 330 has a plurality of grooves 332 extending in the Y-axis direction and defining the fluid passages in the face facing the energy storage device 2.

Each third stopper part 331 extends from the third body part 330 in the X-axis direction, and is in contact with an external face in the Y-Z plane of the energy storage device 2 (specifically its case 21) adjacent to the third body part 330 so as to prevent the energy storage device 2 from being displaced with respect to the third body part 330 in the Y-Z plane.

As shown in FIGS. 1 and 2, the holding member 4 encompasses the energy storage devices 2 and the adjoining members 3 to hold the energy storage devices 2 and the adjoining members 3 all together. The holding member 4 is made of a conductive material such as metal. Specifically, the holding member 4 includes a pair of end members 40 disposed with the energy storage devices 2 therebetween in the X-axis direction, and a pair of coupling members 41 coupling the end members 40.

Each end member 40 is disposed such that a third adjoining member 33 is disposed between the end member 40 and an energy storage device 2 disposed outermost in the X-axis direction. The end member 40 extends in the Y-Z plane. Specifically, as shown in FIG. 2, each end member 40 includes a body 400 having a contour conforming to the energy storage device 2 (a rectangular contour in this embodiment), and a pressing part 401 extending from the body 400 toward the third body part 330 of the third adjoining member 33 to be in contact with the third adjoining member 33 and press the third adjoining member 33.

Figure 8:
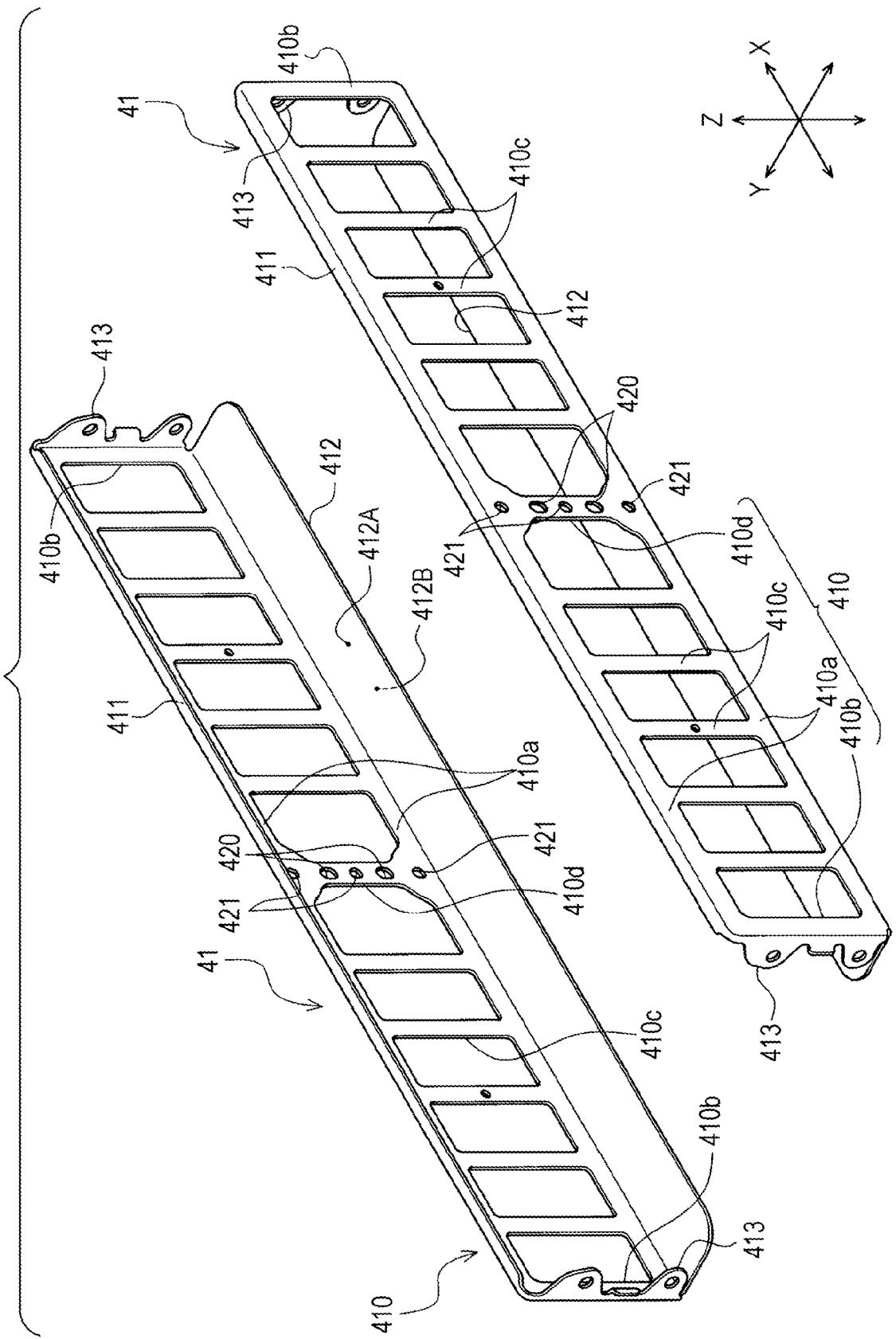
FIG. 8 is a perspective view of a pair of coupling members of the energy storage apparatus.

The pair of coupling members 41 is disposed such that the energy storage devices 2 are between the coupling members 40 in the Y-axis direction. As shown in FIGS. 2 and 8, each coupling member 41 includes a body part 410 facing the energy storage devices 2 in the Y-axis direction, a first extending part 411 extending from the body part 410 and along the first end faces 21A of the energy storage devices 2, a second extending part 412 extending from the body part 410 and along the second end faces 21B of the energy storage devices 2, and an end extending part 413 extending from the body part 410 and along the corresponding end member 40.

The body part 410 is a plane part facing each of the energy storage devices 2 disposed in the X-axis direction (specifically, each of their fourth end faces 21D) in the Y-axis direction. The body part 410 of this embodiment is a rectangular plane extending in the X-Z plane (the plane extending in the X-axis and the Z-axis) and elongated in the X-axis direction. The body part 410 includes a pair of beam parts 410a extending in the X-axis direction and spaced from each other in the Z-axis direction, a pair of first connecting parts 410b extending in the Z-axis direction and connecting the ends of the beam parts 410a, a second connecting part 410c extending in the Z-axis direction and connecting the beam parts 410a in an intermediate area in the X-axis direction (at a position aligned with one of the energy storage devices 2 disposed in the intermediate area in the X-axis direction when viewed from the Y-axis direction in this embodiment), and a third connecting part 410d extending in the Z-axis direction and connecting the beam parts 410a in the intermediate area in the X-axis direction (at a position aligned with the first adjoining member 31 disposed in the intermediate area in the X-axis direction when viewed from the Y-axis direction in this embodiment).

One of the beam parts 410a extends in the X-axis direction and along the areas of the fourth end faces 21D near the first end faces 21A of the energy storage devices 2. The other beam part 410a extends in the X-axis direction and along the areas of the fourth end faces 21D near the second end faces 21B of the energy storage devices 2. In this embodiment, a plurality of second connecting parts 410c are spaced from each other in the X-axis direction.

The first extending part 411 is a plate part extending from the body part 410 (specifically, from the upper beam part 410a) and along the first end faces 21A of the energy storage devices 2, and from one end member 40 to the other end member 40. The first extending part 411 of this embodiment extends in the Y-axis direction from the edge of the body part 410 near the first end faces 21A of the energy storage devices 2 and in the X-axis direction from one end member 40 to the other end member 40.

The second extending part 412 is a plate part extending from the body part 410 (specifically, from the lower beam part 410a) and along the second end faces 21B of the energy storage devices 2, and from one end member 40 to the other end member 40. The second extending part 412 of this embodiment extends in the Y-axis direction from the edge of the body part 410 near the second end faces 21B of the energy storage devices 2 and in the X-axis direction from one end member 40 to the other end member 40. The second extending part 412 is longer than the first extending part 411 in the Y-axis direction.

Each end extending part 413 is a plate part extending from the body part 410 (specifically, from the first connecting part 410b) and along the corresponding end member 40. In this embodiment, the end extending part 413 extends from the end in the X-axis direction of the body part 410 in the Y-axis direction. The end extending part 413 of the coupling member 41 is a part to be fixed to the end member 40 so that the coupling member 41 is coupled to the end member 40. The end extending part 413 of this embodiment is fastened to the end member 40 by a screw B.

The first connecting parts 410b and the second connecting parts 410c are disposed to cover the energy storage devices 2, which are disposed alternately with the adjoining members 3 (the second adjoining members 32 and the third adjoining members 33) in the X-axis direction. In other words, the first connecting parts 410b and the second connecting parts 410c are disposed not to cover the areas for the inlets and outlets of the fluid passages defined by the adjoining members 3 (the second adjoining members 32 and the third adjoining members 33). In this embodiment, a plurality of second connecting parts 410c are disposed between a first connecting part 410b and the third connecting part 410d.

The third connecting part 410d is disposed to cover the first adjoining member 31 in the Y-axis direction. Specifically, the third connecting part 410d is disposed such that its center line extending in the Z-axis direction is overlapped or substantially overlapped with the center line of the first body part 310 (the third face 310C) of the first adjoining member 31 extending in the Z-axis direction when viewed from the Y-axis direction. Based on this arrangement, the width of the third connecting part 410d is designed to be narrower than the thickness (the external dimension in the X-axis direction) of the first body part 310 of the first adjoining member 31. In other words, the third connecting part 410d is disposed not to cover the areas for the inlets and outlets of the fluid passages defined by the first adjoining member 31.

As shown in FIG. 8, each third connecting part 410d has through-holes 420 and 421 extending in the Y-axis direction. Specifically, the third connecting part 410d has the through-hole 420 (this hole is called a first through-hole hereinafter) at the position corresponding to the position of the positioning part 312 of the first adjoining member 31. The through-hole 420 is configured to accept the positioning part 312 of the first adjoining member 31. In this embodiment, the first adjoining member 31 includes two positioning parts 312 spaced from each other in the Z-axis direction on each third face 310C of the first body part 310. Accordingly, two first through-holes 420 are provided in consideration of the arrangement of the two positioning parts 312.

The third connecting part 410*d* also has the through-hole 421 (this hole is called a second through-hole hereinafter) at the fastening position to the first adjoining member 31. In this embodiment, the holding member 4 (the coupling member 41) is fastened to the first adjoining member 31 in a solid area (an area between the recesses 315) in the third face 310C of the first body part 310 of the first adjoining member 31. Accordingly, the holding member 4 (the coupling member 41) has the second through-hole 421 at the position corresponding to the solid area (the area between the recesses 315) in the third face 310C of the first body part 310 of the first adjoining member 31.

In this embodiment, the holding member 4 (the coupling member 41) is fastened to the first adjoining member 31 at a plurality of positions (three positions) spaced from each other in the Z-axis direction. Accordingly, a plurality of second through-holes 421 (three second through-holes 421) are provided to be spaced from each other in the Z-axis direction. In this embodiment, two first through-holes 420 and three second through-holes 421 are provided such that the first through-holes 420 and the second through-holes 421 are disposed alternately in the Z-axis direction.

Figure 9:
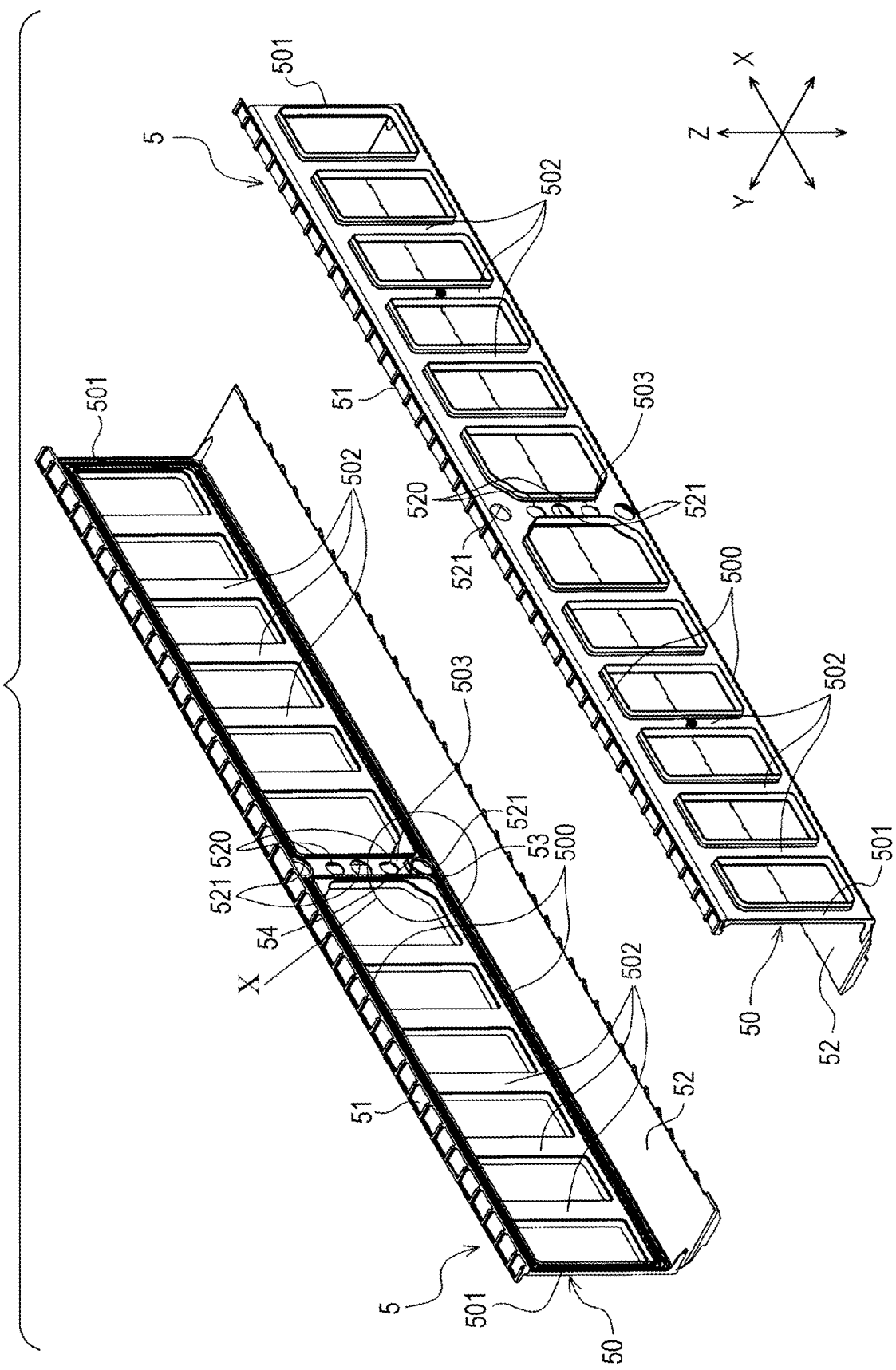
FIG. 9 is a perspective view of a pair of insulators of the energy storage apparatus.

The insulators 5 have insulating properties. In this embodiment, the insulators 5 are made by molding resin. As shown in FIG. 2, each insulator 5 is disposed between the energy storage devices 2 and the corresponding coupling member 41. The insulator 5 covers at least the side (area) of the coupling member 41 facing the energy storage devices 2. The insulator 5 insulates the holding member 4 from the energy storage devices 2. Specifically, as shown in FIG. 9, each insulator 5 includes a body covering part 50 covering the body part 410, a first covering part 51 covering the first extending part 411, and a second covering part 52 covering the second extending part 412.

The body covering part 50 covers the side of the body part 410 facing the energy storage devices 2 (this side is called an opposite face hereinafter). The body covering part 50 has a shape conforming to the body part 410. This means that the body covering part 50 includes a pair of beam covering part 500 covering the sides of the beam parts 410*a* facing the energy storage devices 2, a pair of first connection covering part 501 covering the sides of the first connecting parts 410*b* facing the energy storage devices 2, a plurality of second connection covering parts 502 covering the sides of the second connecting parts 410*c* facing the energy storage devices 2, and a third connection covering part 503 covering the side of the third connecting part 410*d* facing the first adjoining member 31.

The beam covering parts 500 extend in X-axis direction and are spaced from each other in the Z-axis direction as in the beam parts 410*a*.

The first connection covering parts 501 are disposed to cover the first connecting parts 410*b*, and the second connection covering parts 502 are disposed to cover the second connecting parts 410*c*. Specifically, the first connection covering parts 501 and the second connection covering parts 502 are disposed to cover the energy storage devices 2, which are disposed alternately with the adjoining members 3 (the second adjoining members 32 and the third adjoining members 33) in the X-axis direction. In other words, the first connection covering parts 501 and the second connection covering parts 502 are disposed not to cover the areas for the inlets and outlets of the fluid passages defined by the adjoining members 3 (the second adjoining members 32 and the third adjoining members 33). In this embodiment, a plurality of second connection covering parts 502 are disposed between a first connection covering part 501 and the third connection covering part 503.

The third connection covering part 503 is disposed to cover the first adjoining member 31 in the Y-axis direction. Specifically, the third connection covering part 503 is disposed such that its center line extending in the Z-axis direction is overlapped or substantially overlapped with the center line of the first body part 310 (the third face 310C) of the first adjoining member 31 extending in the Z-axis direction when viewed from the Y-axis direction. Based on this arrangement, the width of the third connection covering part 503 is designed to be narrower than the thickness (the dimension in the X-axis direction) of the first body part 310 of the first adjoining member 31. In other words, the third connection covering part 503 is disposed not to cover the areas for the inlets and outlets of the fluid passages defined by the first adjoining member 31.

Each third connection covering part 503 has through-holes 520 and 521 extending in the Y-axis direction. Specifically, the third connection covering part 503 has the through-holes 520 (these holes are called first through-holes hereinafter) at the positions corresponding to the positions of the positioning parts 312 of the first adjoining member 31. The first through-holes 520 are configured to accept the positioning parts 312 of the first adjoining member 31. In this embodiment, the first adjoining member 31 includes two positioning parts 312 spaced from each other in the Z-axis direction on each third face 310C of the first body part 310. Accordingly, two first through-holes 520 are provided in consideration of the arrangement of the two positioning parts 312.

The third connection covering part 503 also has the through-holes 521 (these holes are called second through-holes hereinafter) at the fastening positions to the first adjoining member 31. In this embodiment, the holding member 4 (the coupling member 41) is fastened to the first adjoining member 31 in a solid area (an area between the recesses 315) in the third face 310C of the first body part 310 of the first adjoining member 31. Accordingly, the second through-holes 521 are provided at the positions corresponding to the solid areas (the areas between the recesses 315) in the third face 310C of the first body part 310 of the first adjoining member 31.

In this embodiment, the holding member 4 (the coupling member 41) is fastened to the first adjoining member 31 at a plurality of positions (three positions) spaced from each other in the Z-axis direction. Accordingly, the insulator 5 has a plurality of second through-holes 521 (three second through-holes 521) spaced from each other in the Z-axis direction. In this embodiment, the insulator 5 has two first through-holes 520 and three second through-holes 521, and the first through-holes 520 and the second through-holes 521 are disposed alternately in the Z-axis direction.

Figure 10:
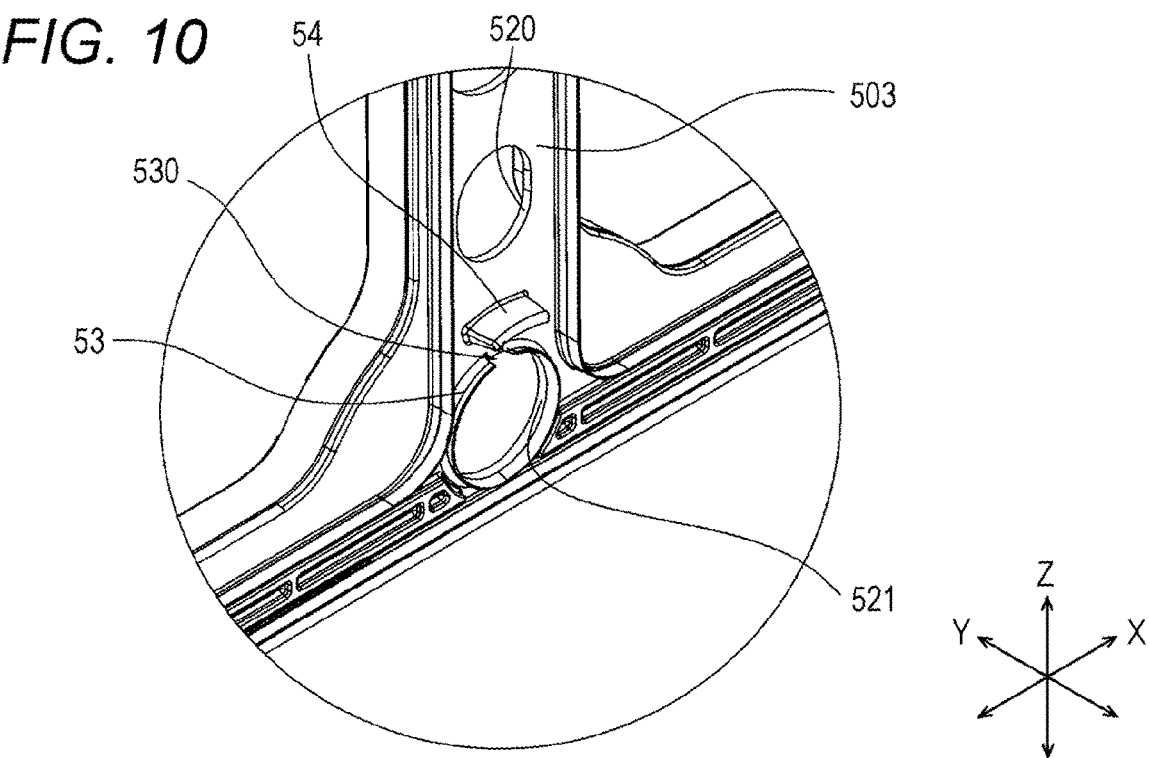
FIG. 10 is an enlarged view of the area X in FIG. 9.

In this embodiment, as shown in FIGS. 9 and 10, each insulator 5 includes an opposite projection 53 disposed outside a fastening position to the holding member 4 (the coupling member 41). Specifically, the insulator 5 includes the opposite projection 53 along the circumference of the second through-hole 521 at the fastening position of the holding member 4 (the coupling member 41) to the first adjoining member 31.

In this embodiment, the insulator 5 has three second through-holes 521 in the third connection covering part 503, however, the opposite projection 53 is provided for a specific second through-hole 521. Specifically, the opposite projection 53 is provided for the second through-hole 521 that is subject to the intrusion of water drops falling from the above (and gathering at the bottom in the vertical direction) after the adhesion due to dew condensation or the like.

In this embodiment, it is presumed that the energy storage apparatus 1 is disposed with the external terminals 20 of the energy storage devices 2 facing up. The opposite projection 53 is thus provided only for the second through-hole 521 that is disposed outermost in the three second through-holes 521 disposed in the Z-axis direction and farthest from the external terminals 20 of the energy storage devices 2.

The opposite projection 53 is disposed on the side of the insulator 5 facing the first adjoining member 31. In this embodiment, since the third connection covering part 503 faces the third face 310C of the first adjoining member 31, the opposite projection 53 is disposed on the side of the third connection covering part 503 facing the third face 310C of the first adjoining member 31. Accordingly, the opposite projection 53 projects from the third connection covering part 503 toward the first adjoining member 31 (in the Y-axis direction). The length of the opposite projection 53 in the Y-axis direction is designed so that the tip end of the opposite projection 53 reaches the third face 310C of the first adjoining member 31. In this embodiment, the length of the opposite projection 53 in the Y-axis direction is designed so that the tip end of the opposite projection 53 presses against the third face 310C of the first adjoining member 31.

The opposite projection 53 is elastically deformable. In this embodiment, the opposite projection 53 is elastically deformed when being pressed against the third face 310C of the first adjoining member 31. Since the opposite projection 53 is a part of the insulator 5 made of molded resin, the radial thickness of the opposite projection 53 is designed to allow the elastic deformation.

In this embodiment, as shown in FIG. 10, the opposite projection 53 is separated in an area around the second through-hole 521 (around the fastening member 6 in the second through-hole 521) so that the opposite projection 53 can be easily deformed. In other words, the insulator 5 has a cut 530 in the opposite projection 53. The cut 530 separates the opposite projection 53 in the circumferential direction of the second through-hole 521 (the fastening member 6 in the second through-hole 521).

Specifically, the opposite projection 53 encompasses an area longer than half the circumference of the second through-hole 521. The cut 530 is thus open in an area shorter than half the circumference of the second through-hole 521 in the circumferential direction of the second through-hole 521. The opposite projection 53 is in the shape of an open ring encompassing the second through-hole 521 and having two circumferential ends defining the cut 530. Accordingly, the cut 530 is open in the projecting direction of the opposite projection 53 and in the direction orthogonal to the projecting direction. In this embodiment, the cut 530 completely separates the opposite projection 53 in the circumferential direction.

In this embodiment, the cut 530 is disposed on the side closer to the external terminals 20 of the energy storage device 2 in the Z-axis direction. In other words, the cut 530 is disposed above the second through-hole 521 when the energy storage apparatus 1 is disposed with the external terminals 20 of the energy storage devices 2 facing up.

In this embodiment, the opposite projection 53 is tapered toward the tip end in its projecting direction. The opposite projection 53 is thus elastically deformed at the tip end in the projecting direction more easily than at the base in the projecting direction.

Each insulator 5 includes an external projection 54 facing the cut 530 outside the opposite projection 53 as well as the opposite projection 53 having the cut 530.

The external projection 54 is disposed on the side of the insulator 5 facing the first adjoining member 31. In this embodiment, since the third connection covering part 503 faces the third face 310C of the first adjoining member 31, the external projection 54 is disposed on the side of the third connection covering part 503 facing the third face 310C of the first adjoining member 31. Accordingly, the external projection 54 projects from the third connection covering part 503 toward the first adjoining member 31 (in the Y-axis direction). The length of the external projection 54 is designed to be longer than the length of the opposite projection 53 in the Y-axis direction. Accordingly, the external projection 54 is formed to fit in the corresponding recess 315 open in the third face 310C of the first adjoining member 31.

The length of the external projection 54 in the direction orthogonal to the projecting direction of the external projection 54 is longer than the opening length of the cut 530 in the same direction. In this embodiment, the external projection 54 is formed in an arc shape when viewed from the Y-axis direction, and the length between the ends of the external projection 54 (the chord length) is longer than the opening length of the cut 530 in the same direction. In this embodiment, the cut 530 is disposed above the second through-hole 521 when the energy storage apparatus 1 is disposed with the external terminals 20 of the energy storage devices 2 facing up. The external projection 54 is thus disposed above the second through-hole 521 and the cut 530.

The first covering part 51 covers at least the side (area) of the first extending part 411 facing the energy storage devices 2. The first covering part 51 of this embodiment covers both sides of the first extending part 411: the side facing the energy storage devices 2 (the first end faces 21A) and the side facing away from the energy storage devices 2.

The second covering part 52 extends from the border between the second extending part 412 and the body part 410 to the edge of the second extending part 412 (the edge in the Y-axis direction) along a side (opposite face) 412A of the second extending part 412 facing the energy storage devices 2 (the second end faces 21B) and folds back at the edge to extend along a side (external face) 412B of the second extending part 412 facing away from the energy storage devices 2. In this way, the second covering part 52 encloses the second extending part 412 to cover both the faces 412A and 412B of the second extending part 412. In other words, the edge of the second covering part 52 (the edge in the Y-axis direction) accepts the edge of the second extending part 412.

As shown in FIG. 2, each fastening member 6 includes a female screw 60 in the first adjoining member 31 and a male screw 61 to be fit in the female screw 60. In this embodiment, the female screw 60 is an insert nut embedded and fixed in the first adjoining member 31. As shown in FIG. 5, the female screw 60 is embedded and fixed in a solid area in the third face 310C of the first adjoining member 31. The female screw 60 has a tapped hole open in the Y-axis direction. As described above, since the holding member 4 (the coupling member 41) is fastened to the first adjoining member 31 at a plurality of positions (three positions) spaced from each other in the Z-axis direction, a plurality of female screws 60 are disposed at the positions corresponding to the fastening positions in the Z-axis direction. The male screw 61 is a common bolt. The male screw 61 is inserted into the corresponding second through-hole 421 in the coupling member 41 and into the corresponding second through-hole 521 in the insulator 5 and screwed into the corresponding female screw 60 in the first adjoining member 31.

With reference back to FIGS. 1 and 2, the bus bar 7 is a conductive plate member made of metal or the like. The bus bar 7 electrically connects the external terminals 20 of different energy storage devices 2. The energy storage apparatus 1 includes a plurality of bus bars 7 corresponding to the plurality of energy storage devices 2. The bus bars 7 of this embodiment electrically connect all the energy storage devices 2 in the energy storage apparatus 1 in series.

Figure 11:
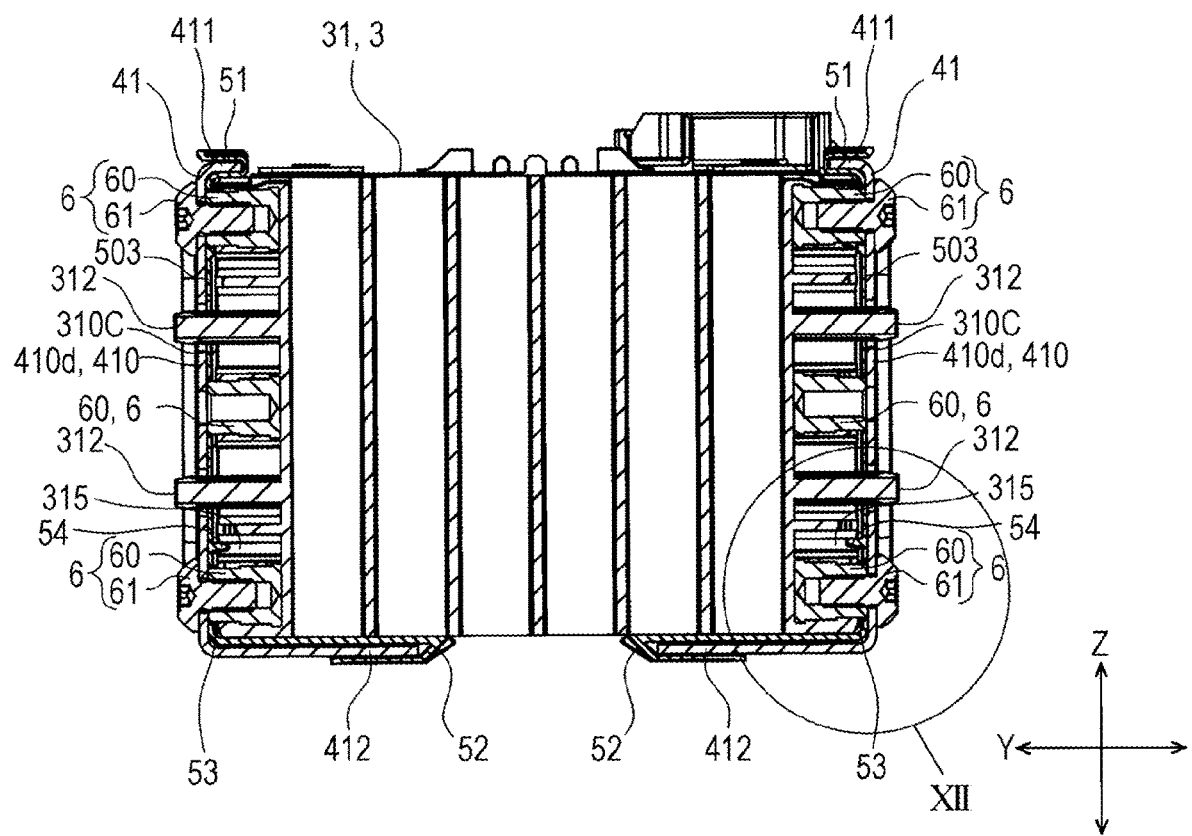
FIG. 11 is a cross-sectional view of FIG. 1 taken along the line XI-XI.
Figure 12:
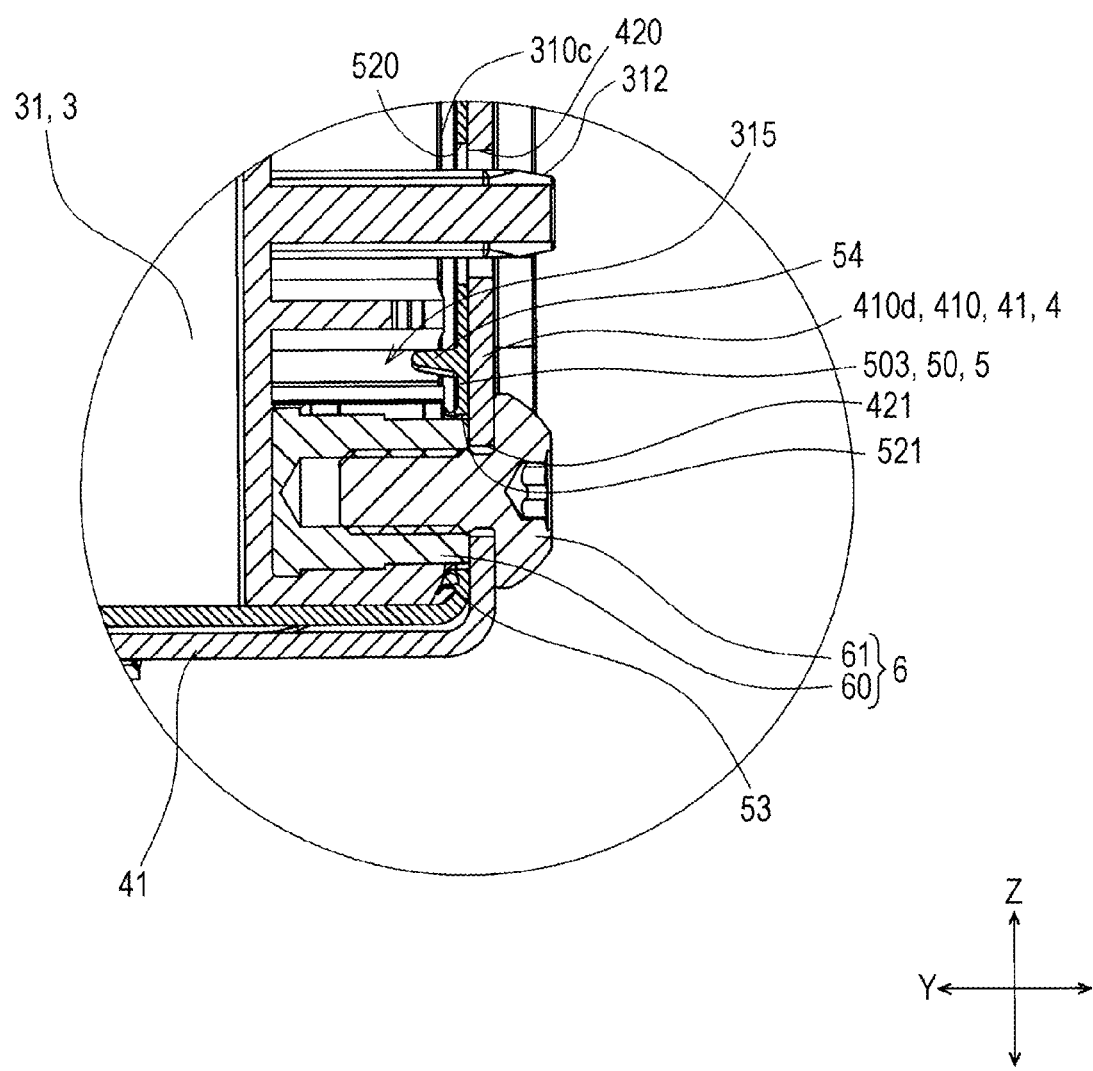
FIG. 12 is an enlarged view of the area XII in FIG. 11.

In the energy storage apparatus 1 of this embodiment described above, as shown in FIG. 11, the holding member 4 (the coupling members 41) is fastened to the first adjoining member 31 by screwing the male screws 61 of the fastening members 6 into the female screws 60 in the first adjoining member 31. Specifically, as shown in FIG. 12, the male screw 61 of the fastening member 6 is inserted into the second through-hole 421 in the coupling member 41 and into the second through-hole 521 in the insulator 5 and screwed into the female screw 60. By screwing the male screw 61 into the female screw 60, the insulator 5 is pressed between the first adjoining member 31 and the holding member 4 (the coupling member 41). Accordingly, the opposite projection 53 of the insulator 5 is pressed against an area between the recesses 315 (a solid area near the female screw 60) in the first adjoining member 31 and elastically deformed. Especially the tip end of the opposite projection 53 is elastically deformed along the external face (the third face 310C) of the first adjoining member 31 since the opposite projection 53 is tapered toward the tip end in the projecting direction. In this way, the opposite projection 53 is pressed against the first adjoining member 31 in a fluid-tight manner. In this embodiment, since the insulator 5 has the cut 530, at least the tip portions of the circumferential ends of the opposite projection 53 (the ends defining the cut 530) come close to each other due to the elastic deformation of the opposite projection 53. In other words, when the opposite projection 53 is pressed against the first adjoining member 31, the opposite projection 53 bends in the radial direction, which makes at least the tip portions of the circumferential ends of the opposite projection 53 (the ends defining the cut 530) come close to each other.

In this state, the external projection 54 of the insulator 5 is in the recess 315 open in the third face 310C of the first adjoining member 31. This allows the external projection 54 to cover the gap between the circumferential ends (the cut 530) of the opposite projection 53.

Accordingly, the opposite projection 53 encompasses the periphery of the fastening member 6 in an area longer than half the circumference of the fastening member 6. Owing to this structure, even if water drops due to dew condensation or the like adhere to the energy storage devices 2 or the like and intrude between the first adjoining member 31 and the insulator 5, the opposite projection 53 facing the periphery of the fastening member 6 (encompassing the fastening member 6) prevents the water drops from reaching the conductive fastening member 6 through the second through-hole 521 in the insulator 5. When the energy storage apparatus 1 is disposed with the external terminals 20 of the energy storage devices 2 facing up (the first end face 21A of the case 21 is disposed above the second end face 21B), water drops falling from the above are stopped by the external projection 54 before reaching the cut 530, which prevents the water drops from reaching the conductive fastening member 6 through the second through-hole 521 in the insulator 5. The liquid junction (short circuit) due to the adhesion of water drops is thus prevented.

As described above, an energy storage apparatus 1, includes: an energy storage device 2;
an insulating adjoining member 3 (a first adjoining member 31) adjoining the energy storage device 2 in a first direction;
a conductive opposite member (coupling member) 41 facing the energy storage device 2 and the adjoining member 3 (the first adjoining member 31) in a second direction orthogonal to the first direction;
an insulating member (insulator) 5 disposed between the energy storage device 2 and adjoining member 3 (first adjoining member 31) and the opposite member (coupling member) 41; and
a conductive fastening member 6 disposed through the insulating member (insulator) 5 in the second direction to fasten the adjoining member 3 (the first adjoining member 31) to the opposite member (coupling member) 41, wherein the insulating member (insulator) 5 includes an opposite projection 53 projecting toward the adjoining member 3 (the first adjoining member 31) and facing the periphery of the fastening member 6, and the opposite projection 53 is in contact with the adjoining member 3 (the first adjoining member 31).

According to this structure, since the insulating member (insulator) 5 is disposed between the energy storage devices 2 and the opposite member (coupling member) 41, the insulating member (insulator) 5 insulates the opposite member (coupling member) 41 from the energy storage devices 2. Since the opposite projection 53 faces the periphery of the conductive fastening member 6 between the adjoining member 3 (the first adjoining member 31) and the insulating member (insulator) 5 (blocks the pass to the fastening member 6), water drops intruding between the insulating member (insulator) 5 and the adjoining member 3 (the first adjoining member 31) cannot reach the fastening member 6. In other words, the opposite projection 53 prevents the intrusion of water drops. Since the insulating member (insulator) 5 has insulating properties, the opposite projection 53 also has insulating properties. This prevents the electrical connection between the opposite projection 53 and the fastening member 6 when water drops intrude and adhere to the opposite projection 53. The liquid junction (short circuit) due to the adhesion of water drops is thus prevented.

The opposite projection 53 is electrically deformable, and the insulating member (insulator) 5 has the cut 530 that separates the opposite projection 53 in the circumferential direction of the fastening member 6.

According to this structure, the cut 530 breaks the continuity of the opposite projection 53 in the circumferential direction. This facilitates the elastic deformation of the opposite projection 53 when the opposite projection 53 comes into contact with the adjoining member 3 (the first adjoining member 31), which provides a tighter contact of the opposite projection 53 with the corresponding member.

The opposite projection 53 is tapered toward the tip end in its projecting direction.

According to this structure, the tip end of the opposite projection 53 is easily deformed when the opposite projection 53 comes into contact with the adjoining member 3 (the first adjoining member 31). This provides a tighter contact of the opposite projection 53 with the adjoining member 3 (the first adjoining member 31).

The insulating member (insulator) 5 includes the external projection 54 disposed outside the opposite projection 53 in the direction orthogonal to the second direction and overlapped with at least the cut 530 and both ends of the opposite projection 53 defining the cut 530 when viewed from the direction orthogonal to the second direction.

According to this structure, the external projection 54 prevents the intrusion of water drops moving toward the cut 530. Even when the cut 530 is provided to facilitate the deformation of the opposite projection 53, the external projection 54 prevents water drops from going over the opposite projection 53 to reach the fastening member 6.

The adjoining member 3 (the first adjoining member 31) has the recess 315 to accept the external projection 54.

This structure enables the external projection 54 to completely cover the cut 530. This structure further prevents the intrusion of water drops into the area encompassed by the opposite projection 53.

It should be noted that the energy storage apparatus of the present invention is not limited to the above embodiment and can be modified in various ways within the spirit of the present invention. For example, an embodiment of the present invention may include some structural elements of another embodiment of the present invention, or some structural elements of an embodiment of the present invention may be replaced with some structural elements of another embodiment of the present invention. In addition, some structural elements of an embodiment of the present invention may be eliminated.

In the above embodiment, the opposite projection 53 in an open ring shape has two circumferential ends defining the cut 530 so that the opposite projection 53 can easily be deformed, however, this is not always the case. For example, the tip end of the opposite projection 53 in the projecting direction has a cut that defines the cut 530 partially separating the opposite projection 53. In other words, the cut 530 may be in other forms as long as the cut 530 breaks the continuity of the tip end of the opposite projection 53. The cut 530 may thus be a linear cut.

In the above embodiment, the insulator 5 has the cut 530 so that the opposite projection 53 can easily be deformed, however, this is not always the case. For example, the opposite projection 53 may be in the shape of an endless ring encompassing the periphery of the fastening member 6 all around the circumference. In other words, the opposite projection 53 may have a continuous tip end to be in contact with the periphery of the fastening member 6 all around the circumference.

In the above embodiment, the first adjoining member 31 is fastened to the opposite member or the holding member 4 (the coupling member 41) at a plurality of fastening positions, and the opposite projection 53 is provided for the fastening position that is subject to the intrusion of water drops, however, this is not always the case. For example, when the first adjoining member 31 is fastened to the coupling member 41 at a plurality of fastening positions as in the above embodiment, the opposite projection 53 may be provided for each of the fastening positions.

In the above embodiment, the cut 530 is disposed above the second through-hole 521 when the energy storage apparatus 1 is disposed with the external terminals 20 of the energy storage devices 2 facing up, however, this is not always the case. The cut 530 may be disposed at any place. When the energy storage apparatus 1 is disposed in a certain manner, the cut 530 may be disposed above the second through-hole 521 and the external projection 54 may be disposed above the cut 530 with the energy storage apparatus 1 being disposed in the certain manner. When the energy storage apparatus 1 is disposed in a certain manner, the cut 530 may be disposed below the second through-hole 521 with the energy storage apparatus 1 being disposed in the certain manner. In this case, since water drops falling from the above are unlikely to intrude into the cut 530, the external projection 54 may be eliminated.

In the above embodiment, the insulator 5 includes the opposite projection 53, however, this is not always the case. For example, the first adjoining member 31 may include the opposite projection 53 projecting toward the insulator 5. Alternatively, the insulator 5 may include the opposite projection 53 projecting toward the first adjoining member 31 while the first adjoining member 31 may include the opposite projection 53 projecting toward the insulator 5. In this case, the opposite projection 53 of the insulator 5 may conform to the opposite projection 53 of the first adjoining member 31. Alternatively, one of the opposite projection 53 of the insulator 5 and the opposite projection 53 of the first adjoining member 31 may be disposed outside the other of the opposite projection 53 of the insulator 5 and the opposite projection 53 of the first adjoining member 31 (in the direction orthogonal to the Y-axis direction), and these opposite projections 53 may be in contact with or pressed against each other.

In the above embodiment, the insulator 5 includes the external projection 54 as well as the opposite projection 53, however, this is not always the case. For example, the insulator 5 may include only the opposite projection 53, and the first adjoining member may include the external projection 54 if the external projection 54 is provided. Alternatively, the first adjoining member 31 may include the opposite projection 53 and the insulator 5 may include the external projection 54.

In the above embodiment, the opposite projection 53 is elastically deformable, however, this is not always the case. For example, the opposite projection 53 is not necessarily elastically deformable as long as at least the tip end of the opposite projection 53 in the projecting direction is in a tight contact with the corresponding element.

In the above embodiment, the opposite projection 53 is tapered toward the tip end in the projecting direction, however, this is not always the case. The opposite projection 53 may have a constant thickness along the entire length in the projecting direction as long as the opposite projection 53 is in a tight contact with the corresponding element.

In the above embodiment, the fastening member 6 includes the female screw 60 integrated with the first adjoining member 31, and the male screw 61 to be fit in the female screw 60, however, this is not always the case. For example, the fastening member 6 may include a male screw 61 integrated with the first adjoining member 31 (this is a so-called insert bolt) and configured to be fit in the through-holes of the insulator (insulating member) 5 and the holding member (opposite member) 4 (the second through-hole 421 and the second through-hole 521), and a female screw (nut) 60 to accept the male screw 61.

In the above embodiment, the fastening member 6 extends through the holding member (opposite member) 4 and the insulator (insulating member) 5 in the Y-axis direction to fasten the holding member (opposite member) 4 to the insulator (insulating member) 5, however, this is not always the case. For example, the fastening member 6 may extend through the holding member (opposite member) 4 and the insulator (insulating member) 5 in the Z-axis direction to fasten the holding member (opposite member) 4 to the insulator (insulating member) 5. In other words, although the second direction is in the Y-axis direction and the third direction is in the Z-direction in the above embodiment, the second direction may be in the Z-axis direction and the third direction may be in the Y-axis direction, for example. Also in this case, the opposite projection 53 is provided with respect to the fastening member 6 that may be subject to the adhesion of water drops due to dew condensation or the like in consideration of the orientation of the energy storage apparatus 1. When the cut 530 is provided, the external projection 54 may be provided with respect to the cut 530.

In the above embodiment, the energy storage device 2 is a nonaqueous electrolyte secondary battery (such as a lithium ion secondary battery) that can be charged and discharged, however, the energy storage device 2 may be of any type and have any capacity. In the above embodiment, the energy storage device 2 is a lithium ion secondary battery, however, this is not always the case. For example, the present invention may be applied to the energy storage device 2 of primary batteries and capacitors such as electric double layer capacitors as well as the energy storage device 2 of various secondary batteries.

What is claimed is:

1. An energy storage apparatus, comprising:
   a plurality of energy storage devices stacked in a first direction;
   an adjoining member disposed between the energy storage devices in the first direction;
   an opposite member facing the energy storage devices in a second direction orthogonal to the first direction;
   an insulating member disposed between the adjoining member and the opposite member; and
   a fastening member disposed through the insulating member in the second direction to fasten the adjoining member to the opposite member,
   wherein at least one of the adjoining member and the insulating member includes an opposite projection projecting in the second direction toward an other of the adjoining member and the insulating member and facing a periphery of the fastening member,
   wherein the opposite projection is in a shape of an open ring having two circumferential ends which define a cut, and
   wherein the at least one of the adjoining member and the insulating member further includes an external projection disposed outside the opposite projection in a direction orthogonal to the second direction and overlapped with at least the cut and both ends of the opposite projection defining the cut when viewed from the direction orthogonal to the second direction.

2. The energy storage apparatus according to claim 1, wherein the insulating member includes the opposite projection projecting in the second direction toward the adjoining member and facing the periphery of the fastening member, and
   wherein the opposite projection has insulating properties and is in contact with the adjoining member.

3. The energy storage apparatus according to claim 2, wherein the opposite projection is elastically deformable, and
   wherein the insulating member further includes the cut separating the opposite projection in a circumferential direction of the fastening member.

4. The energy storage apparatus according to claim 2, wherein the opposite projection is tapered toward a tip end in a projecting direction of the opposite projection.

5. The energy storage apparatus according to claim 2, wherein the insulating member further includes the external projection disposed outside the opposite projection in the direction orthogonal to the second direction and overlapped with at least the cut and the both ends of the opposite projection defining the cut when viewed from the direction orthogonal to the second direction.

6. The energy storage apparatus according to claim 5, wherein the adjoining member includes a recess to accept the external projection.

7. The energy storage apparatus according to claim 2, wherein the energy storage device comprises an external terminal protruding from an upper surface of one of the energy storage devices in a third direction orthogonal to the first direction and the second direction.

8. The energy storage apparatus according to claim 2, wherein the opposite projection prevents an electrical connection between the opposite projection and the fastening member.

9. The energy storage apparatus according to claim 2, wherein the insulating properties of the opposite projection electrically isolate the opposite projection from the fastening member.

10. The energy storage apparatus according to claim 2, wherein the insulating member further includes the cut that opens the opposite projection in a circumferential direction of the fastening member.

11. The energy storage apparatus according to claim 10, wherein the cut opens the opposite projection in a third direction orthogonal to the first direction and the second direction.

12. The energy storage apparatus according to claim 11, wherein the fastening member is exposed from an opening of the cut in the third direction.

13. The energy storage apparatus according to claim 11, wherein the insulating member further includes:
    the external projection disposed outside the opposite projection, and
    wherein, in the third direction, the external projection overlaps with the opening of the cut and the both ends of the opposite projection defining the cut.

14. The energy storage apparatus according to claim 2, wherein the insulating member further includes:
    the cut including an opening in the opposite projection in a circumferential direction of the fastening member; and
    the external projection disposed outside the opposite projection in a third direction orthogonal to the first direction and the second direction.

15. The energy storage apparatus according to claim 14, wherein, in the third direction, the external projection overlaps with the opening of the cut and opposing ends of the opposite projection defining the cut.

16. The energy storage apparatus according to claim 15, wherein, in the third direction, the fastening member is exposed from the opening of the cut and overlaps with the external projection.

17. The energy storage apparatus according to claim 1, wherein the cut includes an opening in the opposite projection in a circumferential direction of the fastening member.

18. The energy storage apparatus according to claim 17, wherein the fastening member is exposed from the opening of the cut and overlaps with the external projection.

* * * * *